(12) United States Patent
Goto et al.

(10) Patent No.: US 9,434,830 B2
(45) Date of Patent: Sep. 6, 2016

(54) EXPANDABLE ACRYLIC RESIN BEAD, EXPANDED ACRYLIC RESIN BEAD, FOAMED MOLDED ARTICLE OF EXPANDED ACRYLIC RESIN BEADS

(71) Applicant: JSP CORPORATION, Chiyoda-ku (JP)

(72) Inventors: Jumpei Goto, Mie (JP); Yota Kuwada, Mie (JP)

(73) Assignee: JSP CORPORATION, Chiyoda-ku (JP)

( * ) Notice: Subject to any disclaimer, the term of this patent is extended or adjusted under 35 U.S.C. 154(b) by 5 days.

(21) Appl. No.: 14/661,614

(22) Filed: Mar. 18, 2015

(65) Prior Publication Data

US 2015/0274920 A1 Oct. 1, 2015

(30) Foreign Application Priority Data

Mar. 25, 2014 (JP) ................. 2014-061462

(51) Int. Cl.
*C08J 9/14* (2006.01)
*C08J 9/228* (2006.01)
*C08J 9/18* (2006.01)
*C08J 9/224* (2006.01)
*C08J 9/232* (2006.01)

(52) U.S. Cl.
CPC ............ *C08J 9/228* (2013.01); *C08J 9/141* (2013.01); *C08J 9/18* (2013.01); *C08J 9/224* (2013.01); *C08J 9/232* (2013.01); *C08J 2201/036* (2013.01); *C08J 2203/14* (2013.01); *C08J 2207/00* (2013.01); *C08J 2333/12* (2013.01)

(58) Field of Classification Search
CPC ............ C08J 9/141; C08J 9/18; C08J 9/224; C08J 9/228; C08J 9/232; C08J 2201/036; C08J 2203/14; C08J 2207/00; C08J 2333/12
See application file for complete search history.

(56) References Cited

U.S. PATENT DOCUMENTS

2007/0254972 A1* 11/2007 Haraguchi ............ C08F 220/14
521/60

FOREIGN PATENT DOCUMENTS

| JP | 50-22054 | 3/1975 |
| JP | 04332751 A * | 11/1992 |
| JP | 2001-233986 | 8/2001 |

* cited by examiner

*Primary Examiner* — Irina S Zemel
(74) *Attorney, Agent, or Firm* — Oblon, McClelland, Maier & Neustadt, L.L.P.

(57) ABSTRACT

Provided are: expandable acrylic resin bead and expanded acrylic resin bead, both having excellent moldability and capable of providing a foamed molded article that generates less soot during combustion and has a low decomposition gas generation speed; and a foamed molded article obtained through in-mold molding the expanded acrylic resin beads. The expandable acrylic resin bead is composed of an acrylic resin and a physical blowing agent impregnated therein. The acrylic resin contains a methacrylic ester component (A) and an acrylic ester component (B). The content of the component (A) is 85 to 99 mol % with respect to a total 100 mol % of the component (A) and the component (B). At least one of the component (A) and the component (B) contains a component having a polycyclic saturated hydrocarbon group. The glass transition temperature of the acrylic resin is 112 to 125° C.

15 Claims, No Drawings

EXPANDABLE ACRYLIC RESIN BEAD, EXPANDED ACRYLIC RESIN BEAD, FOAMED MOLDED ARTICLE OF EXPANDED ACRYLIC RESIN BEADS

CROSS-REFERENCE

This application claims priority to Japanese patent application no. 2014-061462 filed on Mar. 25, 2014, the contents of which are entirely incorporated herein by reference.

BACKGROUND OF THE INVENTION

1, Field of the Invention

The present invention relates to expandable acrylic resin bead impregnated with a physical blowing agent, expanded acrylic resin bead obtained through expansion of the expandable acrylic resin bead, and an acrylic resin molded article obtained by in-mold molding the expanded beads.

2, Description of the Background Art

Conventionally, a foamed molded article has been used as, for example, an evaporative pattern for casting. Specifically, the foamed molded article has been used in a casting process as described below. First, the foamed molded article having a desired shape is embedded in sand, and then a molten metal is poured in the foamed molded article in the sand. At this moment, the foamed molded article thermally decomposes, and is replaced with the molten metal. Then, by cooling the molten metal, a metal casting is obtained.

As the foamed molded article for evaporative patterns, a foamed molded article of expanded styrene resin beads has been used. However, using the foamed molded article of expanded styrene resin beads has a problem related to generation of soot in large amount upon thermal decomposition of the molded article. This soot smears the surface of the casting, and may cause a generation of pinholes inside the casting. The reason for soot generation is thought to be because the styrene resin has aromatic rings. Thus, for the purpose of reducing the generation amount of soot, technologies have been disclosed regarding the usage of, as an evaporative pattern, foamed molded articles made of a polymer of a methacrylic ester not having aromatic rings (cf. Patent Document 1 and Patent Document 2).

PRIOR ART DOCUMENT

Patent Documents

Patent Document 1: JP-A-S50-22054
Patent Document 2: JP-A-2001-233986

SUMMARY OF THE INVENTION

However, when a foamed molded article of expanded methacrylic ester polymer beads is used as a foamed molded article for evaporative patterns, although soot generation is reduced, castability may decrease due to the decomposition rate of the foamed molded article becoming too fast. For example, compared to when a foamed molded article of expanded styrene resin beads is used, productivity may deteriorate as a result of, when pouring a molten metal in a mold, the molten metal having difficulty in sufficiently spreading throughout the mold or the molten metal being spitted outside the mold.

Generally, a foamed molded article of expanded beads is obtained using expandable resin beads as described below. First, expanded beads are obtained by expanding the expandable resin beads, and then a foamed molded article of expanded beads is obtained by in-mold molding the expanded beads. Here, expanded beads and expandable resin beads, which are composed of a polymer of a methacrylic ester or a copolymer of a methacrylic ester and an acrylic ester etc., sometimes have a narrow molding condition range. Thus, when such expandable resin beads and expanded beads are used, there are cases where obtaining a molded article of expanded beads having a complicated shape becomes difficult, smoothness of the surface of the obtained article is reduced, or shrinkage of the molded article occurs easily. As a result, since the appearance of the molded article is sometimes deteriorated, the expandable resin beads and expanded beads still have problems related to moldability.

The present invention has been made in view of such a background. An objective of the present invention is to provide: expandable acrylic resin bead and expanded acrylic resin bead, both having excellent moldability and capable of providing an acrylic resin foamed molded article that generates less soot during combustion and has a low decomposition gas generation speed; and a foamed molded article obtained by in-mold molding the expanded acrylic resin beads.

One aspect of the present invention resides in an expandable acrylic resin bead including an acrylic resin having a glass transition temperature of 112 to 125° C.; and a physical blowing agent;

wherein the acrylic resin includes a methacrylic ester component (A) and an acrylic ester component (B), a content of the component (A) being 85 to 99 mol % with respect to a total 100 mol % of the component (A) and the component (B), and at least one of the component (A) and the component (B) containing a component having a polycyclic saturated hydrocarbon group.

Another aspect of the present invention resides in an expanded acrylic resin bead obtained by expansion of the expandable acrylic resin bead.

Further another aspect of the present invention resides in a foamed molded article obtained by in-mold molding the expanded acrylic resin beads.

In the expandable acrylic resin bead (hereinafter, referred to as "expandable resin bead" as appropriate), the acrylic resin contains the methacrylic ester component (A) and the acrylic ester component (B) at the predetermined ratio described above. By using the expandable resin beads, the acrylic resin foamed molded article (hereinafter, referred to as "foamed molded article" as appropriate) that generates less soot during combustion or casting can be obtained. In addition, the speed at which a thermal decomposition gas is generated from the foamed molded article can be lowered, and easiness in casting production can be improved.

Furthermore, in the expandable resin bead, at least one of the component (A) and the component (B) contains the component having the polycyclic saturated hydrocarbon group, and the glass transition temperature of the acrylic resin is 112 to 125° C. As a result, the expandable resin bead has improved expandability due to having superior ability for impregnation of the blowing agent during production, the expanded acrylic resin bead (hereinafter, referred to as "expanded bead" as appropriate) obtained by expansion of the expandable resin bead has a wider molding condition range, and molding of a foamed molded article having a complicated shape becomes possible. Furthermore, the obtained foamed molded article is particularly suitably used as casting patterns since having superior dimensional stability and excellent appearance.

DESCRIPTION OF THE PREFERRED EMBODIMENTS

Next, preferable embodiments of the expandable resin bead, the expanded bead, and the foamed molded article will be described. The expandable resin bead contains at least an acrylic resin as a resin component. The acrylic resin contains the methacrylic ester component (A) and the acrylic ester component (B) as described above. The acrylic resin is preferably a copolymer of the component (A) and the component (B).

Examples of the component (A) include methacrylic alkyl esters such as methyl methacrylate, ethyl methacrylate, propyl methacrylate, butyl methacrylate, and 2-ethylhexyl methacrylate, etc. Examples of the component (B) include acrylic alkyl esters such as methyl acrylate, ethyl acrylate, propyl acrylate, butyl acrylate, and 2-ethylhexyl acrylate, etc.

In the acrylic resin, the content of the component (A) is 85 to 99 mol % with respect to the total 100 mol % of the component (A) and the component (B) as described above. When the content of the component (A) is much larger than that defined by this range, the amount of tertiary radicals produced during decomposition of the acrylic resin becomes large, and the decomposition reaction rate of the acrylic resin may increase. On the other hand, when the content of the component (A) is too small, although the decomposition reaction is suppressed, expandability of the expandable resin bead and moldability of the expanded beads may deteriorate. From a similar standpoint, the content of the component (A) is more preferably 90 to 98 mol % and further preferably 92 to 97 mol %. In such cases, decomposition reaction of the acrylic resin can be controlled more easily, and the decomposition reaction rate can be kept low with more certainty at a level that does not affect easiness in casting production.

In addition, in the acrylic resin, at least one of the component (A) and the component (B) contains a component having a polycyclic saturated hydrocarbon group. More specifically, the polycyclic saturated hydrocarbon group is included in one or both of the component (A) and the component (B). Furthermore, when the component (A) has the polycyclic saturated hydrocarbon group, some or all of the component (A) may have the polycyclic saturated hydrocarbon group. Similarly, when the component (B) has the polycyclic saturated hydrocarbon group, some or all of the component (B) may have the polycyclic saturated hydrocarbon group.

The polycyclic saturated hydrocarbon group is preferably dicyclopentanyl group, adamantyl group, norbornyl group, or isobornyl group. Since the acrylic resin has the polycyclic saturated hydrocarbon group, impregnating ability of the blowing agent into the acrylic resin is improved, and, as a result, expandability of the expandable resin bead is improved. In addition, since the polycyclic saturated hydrocarbon group is a very bulky substituent, it becomes easy to adjust the glass transition temperature of the acrylic resin so as to be within the above described range. Since moldability of the expanded beads is improved, appearance of the foamed molded article is improved, and the foamed molded article having a complicated shape can be obtained easily. In addition, dimensional stability of the foamed molded article can be improved. From a similar standpoint, the polycyclic saturated hydrocarbon group is more preferably tetrahydro dicyclopentadienyl group or isobornyl group, and most preferably isobornyl group.

In the component (A) and/or the component (B), the polycyclic saturated hydrocarbon group forms an ester bond with (meth)acrylic acid. Here, (meth)acrylic acid is a concept including acrylic acid and/or methacrylic acid.

The glass transition temperature of the acrylic resin is 112 to 125° C. as described above. The glass transition temperature of the acrylic resin can be adjusted in the above described range, for example, by controlling a content ratio of the component (A) and the component (B), and specifying the type of the polycyclic hydrocarbon group. If the glass transition temperature of the acrylic resin is much lower than that defined by the above described range, the surface of the foamed molded article cannot withstand the heat from steam during molding, and its surface may melt partially or the smoothness of the surface of the foamed molded article may deteriorate due to excessive expansion of the expanded beads. On the other hand, if the glass transition temperature is too high, preliminary expanding of the expandable resin bead by an expanding machine used for the expandable polystyrene bead becomes difficult, and moldability may deteriorate. From a similar standpoint, the lower limit of the glass transition temperature is preferably 114° C. and more preferably 115° C. On the other hand, the upper limit of the glass transition temperature is preferably 123° C., more preferably 122° C., and further preferably 121° C. In such cases, the molding condition range of the expanded beads becomes wider, moldability of the expanded beads is further improved, and molding of the foamed molded article having a complicated shape becomes easier.

In addition, the content of the component having the polycyclic saturated hydrocarbon group is preferably not more than 20 mol % with respect to the total 100 mol % of the component (A) and the component (B). Within this range, the glass transition temperature can be more easily adjusted in the above described range, and moldability of the expanded beads can be further improved. From a similar standpoint, the content of the component having the polycyclic saturated hydrocarbon group with respect to the total 100 mol % of the component (A) and the component (B) is preferably not more than 15 mol %, further preferably not more than 12 mol %, and most preferably not more than 10 mol %. In addition, the content of the component having the polycyclic saturated hydrocarbon group with respect to the total 100 mol % of the component (A) and the component (B) is preferably not less than 1 mol % and further preferably not less than 2 mol %.

The acrylic resin may contain other monomer components other than the component (A) and the component (B) as long as the objective of the present invention is not hindered. For example, the acrylic resin may be a copolymer of the component (A), the component (B), and another monomer component.

Furthermore, other resins, additives, and the like may be blended in the acrylic resin as long as the objective of the present invention is not hindered. The content of other components with respect to 100 parts by mass of the acrylic resin is preferably not more than 10 parts by mass, more preferably not more than 5 parts by mass, and further preferably not more than 3 parts by mass.

The weight-average molecular weight of the acrylic resin is preferably 50,000 to 300,000, When the weight-average molecular weight is within this range, expandability of the expandable resin bead or the expanded bead is further improved, and appearance and strength of the foamed molded article are further improved. From a similar standpoint, the weight-average molecular weight of the acrylic resin is more preferably 100,000 to 250,000.

The expandable resin bead contains the physical blowing agent. As the physical blowing agent, for example, a saturated hydrocarbon or the like having a carbon number of 3 to 6 can be used. More specifically, for example, propane, n-butane, isobutane, cyclobutane, n-pentane, isopentane, neopentane, cyclopentane, n-hexane, or cyclohexane, etc., can be used. As the physical blowing agent, the above described substances may be used singly or as a mixture of two or more. It should be noted that an alicyclic saturated hydrocarbon such as cyclopentane and cyclohexane can serve not only as a blowing agent but also as a plasticizing agent.

The physical blowing agent preferably contains the alicyclic saturated hydrocarbon. The amount of the alicyclic saturated hydrocarbon in the total amount of the physical blowing agent is preferably 10 to 50 mass %, more preferably 15 to 40 mass %, and further preferably 20 to 35 mass %. In such cases, the alicyclic saturated hydrocarbon serves not only as a blowing agent but also as a plasticizing agent, and expandability and moldability are further improved.

The content ratio of volatile components in the expandable resin bead is preferably not higher than 10 mass % and more preferably not higher than 9.5 mass %. When the content ratio of volatile components is within this range, moldability of the expanded beads is further improved, and a finer cell structure can be formed in the expanded bead. As a result, strength of the foamed molded article can be further improved. It should be noted that the content ratio of volatile components in the expandable resin bead is not lower than about 5 mass %.

The content ratio of water in the expandable resin bead is preferably not higher than 1 mass %. When the water contents is within this range, growing of cells in the expanded bead is suppressed, and strength of the foamed molded article can be further improved. The lower limit of the content ratio of water in the expandable resin bead is about 0.3 mass %.

The mean bead diameter of the expandable resin beads is preferably 0.3 to 1.5 mm. When the mean bead diameter is within this range, since filling ability of the expanded beads is further improved, for example, a foamed molded article having a complicated shape such as an evaporative pattern can be obtained more easily, and appearance of the foamed molded article is further improved. From a similar standpoint, the mean bead diameter of the expandable resin beads is more preferably 0.4 to 1 mm.

The expanded bead can be obtained by expanding and foaming the expandable resin bead using, for example, a hitherto known method. The expanding and foaming is performed by applying heat to the expandable resin bead, and, for example, can be performed by supplying heating medium such as steam to the expandable resin bead. Specifically, there is a method of expanding and foaming the expandable resin bead through application of heat with steam or the like using, for example, a cylindrical expanding machine having a stirring device.

The foamed molded article is obtained by mutually fusion-bonding a large number of expanded beads in a mold cavity. Examples of the method for molding the expanded beads include an in-mold molding method of filling a mold cavity with the expanded beads, and applying heat thereto using steam or the like. It should be noted that the foamed molded article can be suitably used in casting process as an evaporative pattern.

In such a case, the above described advantageous effects of generating less soot during combustion, having a low decomposition gas generation speed, and having superior moldability become significant.

EXAMPLES

Example 1

In the following, a method for producing the expandable resin beads of the present example will be described.

First, in an autoclave whose internal volume is 3 L and that has a stirring device, 700 g of deionized water, 5.8 g of a suspending agent, 7.0 g of a surfactant, 1.1 g of an electrolyte (sodium acetate), and 2.5 g of a suspension aid were added. As the suspending agent, tricalcium phosphate (manufactured by Taihei Chemical Industrial Co., Ltd., 20.5 mass % slurry) was used. As the surfactant, disodium dodecyl diphenyl ether sulfonate (Pelex SSH manufactured by Kao Corp., 1 mass % solution) was used. As the suspension aid, a 0.01 mass % solution of potassium persulfate was used.

A mixture of 425 g of methyl methacrylate, 50 g of dicyclopentanyl methacrylate, and 25 g of methyl acrylate was used as monomer components. In the mixture, 0.66 g of a polymerization initiator A (t-butylperoxy-2-ethylhexanoate (Perbutyl O manufactured by NOF Corp.)), 0.66 g of a polymerization initiator B (t-butylperoxy-2-ethylhexyl monocarbonate (Perbutyl E manufactured by NOF Corp.)), 30 g of a plasticizing agent (cyclohexane), and 1.05 g of a chain transfer agent (n-octyl mercaptan (manufactured by Tokyo Chemical Industry Co., Ltd.)) were dissolved. A dissolution product obtained therefrom was added in the autoclave while the content thereof was stirred at a stirring speed of 400 rpm. In the present example, with respect to a total 100 mol % of the methacrylic ester component and the acrylic ester component, the blended amount of methyl methacrylate was 89 mol %, the blended amount of dicyclopentanyl methacrylate, which is a methacrylic ester having the polycyclic saturated hydrocarbon group, was 5 mol %, and the blended amount of methyl acrylate was 6 mol %.

Next, air inside the autoclave was replaced with nitrogen, and the autoclave was hermetically closed. Subsequently, heating was initiated while the content in the autoclave was stirred at a stirring speed of 400 rpm, and the temperature inside the autoclave was increased to 70° C. over a course of 1 hour and 15 minutes. After the temperature reached 70° C., this temperature of 70° C. was maintained for 8 hours. Then, the temperature was increased to 115° C. over a course of 2 hours. Next, after the temperature reached 115° C., this temperature of 115° C. was maintained for 5 hours. Then, the temperature inside the autoclave was cooled to 35° C. over a course of 4 hours, and further cooled to room temperature. It should be noted that a blowing agent was added to the content of the autoclave over a course of 30 minutes at the sixth hour after the temperature reached 70° C. As the blowing agent, 80 g of pentane (a mixture of 80 mass % n-pentane and 20 mass % i-pentane) was used. After the blowing agent was added, the stirring speed was lowered to 350 rpm. The above described cyclohexane added as the plasticizing agent in advance also serves as a blowing agent.

After the inside of the autoclave was cooled to room temperature, expandable resin beads, which are the content thereof, were taken out. Nitric acid was added to the expandable resin beads to dissolve tricalcium phosphate adhered to the surfaces of the expandable resin beads. Next, by using a centrifuge, the expandable resin beads were dewatered and rinsed, and then water adhered to the surfaces of the expandable resin beads was removed using an air-flow drying device.

Next, the expandable resin beads were passed through a sieve, and beads having a diameter of 0.3 to 0.6 mm were extracted. Next, with respect to 100 parts by mass of the expandable resin beads, 0.03 parts by mass of dimethyl silicone was added as a liquid additive, and 0.04 parts by mass of N,N-bis(2-hydroxyethyl)alkylamine was added as an antistatic agent. In addition, with respect to 100 parts by mass of the expandable resin beads, a mixture of 0.20 parts by mass of zinc stearate, 0.30 parts by mass of calcium stearate, and 0.07 parts by mass of glycerin monostearate were added and mixed. In the manner described above, the expandable resin beads were coated with various additives. The content ratio of the methacrylic ester component and the acrylic ester component, the content ratio of the polycyclic (meth)acrylic ester, and the content ratio of the blowing agent, etc., in the expandable resin beads prepared in the present example are shown in Table 1 described later.

Next, expanded beads were prepared by expanding the expandable resin beads, and then a foamed molded article was prepared using the expanded beads.

Specifically, first, 200 g of the expandable resin beads was added in a normal pressure preliminary expanding machine having a capacity of 30 L. Next, steam was supplied in the preliminary expanding machine while the expandable resin beads were stirred. In such manner, the expandable resin beads were expanded and foamed to obtain expanded beads having a bulk density of 20 kg/m$^3$. The obtained expanded beads were aged by keeping them at room temperature for 1 day.

Then, the expanded beads were loaded in the cavity of a metal mold of a mold-object molding machine (DSM-0705VS manufactured by DABO Inc.). Next, the expanded beads in the cavity were heated for 10 seconds at a steam pressure of 0.07 to 0.09 MPa (gauge pressure), and cooled for a predetermined period of time. Then, the foamed molded article was taken out from the foamed molded article. The cavity of the metal mold has a rectangular parallelepiped shape with a dimension of height 300 mm×width 75 mm×thickness 25 mm. The obtained foamed molded article was dried for 1 day at a temperature of 40° C., and used for various evaluations described later.

Example 2

Expandable resin beads, expanded beads, and a foamed molded article were prepared in a manner similar to Example 1, except for changing the blended amount of methyl methacrylate to 91 mol %, changing the blended amount of dicyclopentanyl methacrylate to 3 mol %, and changing the content ratio of the blowing agent to the ratio shown in Table 1 described later.

Example 3

Expandable resin beads, expanded beads, and a foamed molded article were prepared in a manner similar to Example 1, except for changing the blended amount of methyl methacrylate to 87 mol %, changing the blended amount of dicyclopentanyl methacrylate to 7 mol %, and changing the content ratio of the blowing agent to the ratio shown in Table 1 described later.

Example 4

Expandable resin beads, expanded beads, and a foamed molded article were prepared in a manner similar to Example 1, except for using 5 mol % isobornyl methacrylate instead of 5 mol % dicyclopentanyl methacrylate, and changing the content ratio of the blowing agent to the ratio shown in Table 1 described later.

Example 5

Expandable resin beads, expanded beads, and a foamed molded article were prepared in a manner similar to Example 1, except for using 5 mol % methyl adamantyl methacrylate instead of 5 mol % dicyclopentanyl methacrylate, and changing the content ratio of the blowing agent to the ratio shown in Table 1 described later.

Example 6

Expandable resin beads, expanded beads, and a foamed molded article were prepared in a manner similar to Example 1, except for using 98 mol % methyl methacrylate as the methacrylic ester component, using 2 mol % dicyclopentanyl acrylate as the acrylic ester component, and changing the content ratio of the blowing agent to the ratio shown in Table 1 described later.

Example 7

Expandable resin beads, expanded beads, and a foamed molded article were prepared in a manner similar to Example 1, except for using 96 mol % methyl methacrylate as the methacrylic ester component, using 4 mol % dicyclopentanyl acrylate as the acrylic ester component, and changing the content ratio of the blowing agent to the ratio shown in Table 1 described later.

Example 8

Expandable resin beads, expanded beads, and a foamed molded article were prepared in a manner similar to Example 1, except for using 95 mol % methyl methacrylate as the methacrylic ester component, using 5 mol % dicyclopentanyl acrylate as the acrylic ester component, and changing the content ratio of the blowing agent to the ratio shown in Table 1 described later.

Comparative Example 1

The following points were changed from Example 1. Specifically, the surfactant was changed to 5.6 g of disodium dodecyl diphenyl ether sulfonate (Pelex SSH manufactured by Kao Corp., 1 mass % solution), and the monomer components were changed to 375 g of methyl methacrylate, 90 g of styrene, and 35 g of alpha-methylstyrene. In addition, the polymerization initiator A was changed to 2.5 g of a polymerization initiator C (benzoyl peroxide (Nyper BW manufactured by NOF Corp., water-diluted fine-particle article)), and the amount of the polymerization initiator B was changed to 0.67 g, the plasticizing agent was changed to 7.5 g of xylene, and the chain transfer agent was changed to 1.0 g of alpha-methylstyrene dimer (Nofmer MSD manufactured by NOF Corp.). Other than these changes, in a manner similar to Example 1, a dissolution product was prepared and added in an autoclave, nitrogen gas replacement was performed, and the autoclave was hermetically closed.

Subsequently, heating was initiated while the content in the autoclave was stirred at a stirring speed of 400 rpm, and the temperature inside the autoclave was increased to 80° C.

over a course of 1.5 hours. After the temperature reached 80° C., the temperature was further increased to 115° C. over a course of 6 hours, and this temperature of 115° C. was maintained for 5 hours. Then, the temperature inside the autoclave was cooled to 30° C. over a course of approximately 6 hours. Part way through the temperature increase from 80° C. to 115° C. as described above, more specifically when the temperature reached 110° C., 80 g of pentane (a mixture of 80 mass % n-pentane and 20 mass % isopentane) was added as a blowing agent to the content inside the autoclave over a course of approximately 60 minutes. The stirring speed was lowered to 350 rpm after 30 minutes from when the blowing agent was added. After the inside of the autoclave was cooled to room temperature, expandable resin beads, which are the content thereof, were taken out. Other than the changes described above, the expandable resin beads, expanded beads, and a foamed molded article were prepared in a manner similar to Example 1, The content ratio of the methacrylic ester component and the acrylic ester component, the content ratio of the polycyclic(meth)acrylic ester, and the content ratio of the blowing agent, etc., in the expandable resin beads prepared in the present example are shown in Table 2 described later.

Comparative Example 2

Expandable resin beads, expanded beads, and a foamed molded article were prepared in a manner similar to Example 1, except for using 100 mol % methyl methacrylate as the methacrylic ester component and not using the acrylic ester component, and changing the content ratio of the blowing agent to the ratio shown in Table 2 described later.

Comparative Example 3

Expandable resin beads, expanded beads, and a foamed molded article were prepared in a manner similar to Example 1, except for using 94 mol % methyl methacrylate as the methacrylic ester component, using 6 mol % methyl acrylate as the acrylic ester component, and changing the content ratio of the blowing agent to the ratio shown in Table 2 described later.

Comparative Example 4

Expandable resin beads, expanded beads, and a foamed molded article were prepared in a manner similar to Example 1, except for using 88 mol % methyl methacrylate and 6 mol % cyclohexyl methacrylate as the methacrylic ester component, using 6 mol % methyl acrylate as the acrylic ester component, and changing the content ratio of the blowing agent to the ratio shown in Table 2 described later.

For the expandable resin beads prepared in each of the Examples and Comparative Examples, average molecular weight, glass transition temperature of the acrylic resin, the content of volatile components, content ratio of water, mean bead diameter were measured in the following manner. In addition, expandability of the expandable resin beads was evaluated. The results are shown in Tables 1 and 2.

[Average Molecular Weight Measurement]

The average molecular weight of each of the acrylic resins in the expandable resin beads was measured. As the average molecular weight, a number-average molecular weight $Mn$, a weight-average molecular weight $Mw$, and a Z-average molecular weight $Mz$ were measured. These average molecular weights can be measured by Gel Permeation Chromatography (GPC) method in which polystyrene is used as a standard substance. Specifically, measurement was performed using HLC-8320GPC EcoSEC manufactured by Tosoh Corp (Co., Ltd.) under a condition of eluent: tetrahydrofuran (THF), THF flow rate: 0.6 ml/minute, and sample concentration: 0.1 wt %. For the measurement, a column obtained by serially connecting TSK guard column SuperH-H×1 and TSK-GEL SuperHM-H×2 was used. Thus, the expandable resin beads were dissolved in tetrahydrofuran (THF), and their molecular weight was measured using gel permeation chromatography (GPC). Then, by calibrating the measured value using the standard polystyrene, the number-average molecular weight, the weight-average molecular weight, and the Z-average molecular weight were each obtained.

[Glass Transition Temperature Measurement]

The glass transition temperature can be measured through Differential Scanning Calorimetry (DSC) analysis.

Specifically, first, purification of the expandable resin beads was performed through reprecipitation thereof. More specifically, 1 g of the sample of the expandable resin beads was dissolved in 10 mL of methyl ethyl ketone. Next, while vigorously stirring 500 mL of methanol, the obtained methyl ethyl ketone solution was dripped into the methanol to precipitate the resin. The precipitated resin was filtered, and air-dried at room temperature. Then, the resin was vacuum-dried until its weight became constant. In such manner, a sample that had been purified through reprecipitation was obtained. Next, 2 mg of this sample was weighed, and DSC analysis was performed thereon. The analysis was performed as set forth in JIS K 7121 (1987) using a DSC measuring device Q1000 manufactured by TA Instruments. Then, a midpoint glass transition temperature of a DSC curve obtained under a condition of a temperature increase rate of 10° C./minute was obtained. This temperature was used as the glass transition temperature $Tg$. It should be noted that, instead of the expandable resin beads, the glass transition temperature can also be measured using a sample of the expanded beads or the foamed molded article.

[Measurement of Content Ratio of Volatile Components]

Approximately 1 g of the expandable resin beads was weighed precisely to the fourth decimal place. Then, the expandable resin beads were kept for 4 hours in a hot air dryer set at a temperature of 120° C. Next, the expandable resin beads were cooled to room temperature, and the expandable resin beads were weighed. The total amount of volatile components was calculated from the weight change before and after the heating, and the amount of volatile components was calculated by subtracting the content of the water component from the total amount of volatile components. The calculation formulae are each shown below.

Content ratio of total volatile components (mass %)= (mass before heating (g)−mass after heating (g))÷mass before heating (g)×100

Content ratio of volatile components (mass %)=content ratio of total volatile components (mass %)−content ratio of water (mass %)

[Measurement of Content Ratio of Water]

First, 0.28 g of the expandable resin beads was weighed. Next, the water component inside the expandable resin beads was evaporated by heating the expandable resin beads to a temperature of 160° C. using a heating moisture-vaporizing device, and the content ratio of water was measured using a Karl Fischer moisture meter AQ-6 manufactured by Hiranuma Sangyo Co., Ltd.

[Mean Bead Diameter Measurement]

The expandable resin beads were passed through a sieve in accordance with JIS standard (JIS Z 8801), and, by measuring the weight of the expandable resin beads remaining on the sieve, the weight fraction of each fraction was obtained. By using the Rosin-Rammler distribution function, a bead diameter was obtained by integrating the bead diameters from the small bead size side to 63 wt %. This was used as a mean bead diameter.

[Expandability Evaluation]

The evaluation of expandability was performed by measuring the bulk density of the expanded beads obtained by expanding the expandable resin beads. Specifically, first, steam at a pressure of 3 kPa (gauge pressure) was supplied to the expandable resin beads inside a shelf type expanding machine for 270 seconds to expand the expandable resin beads. As a result, the expanded beads were obtained. The obtained expanded beads were air-dried for 1 day. Then, a 1-L measuring cylinder was prepared, and the expanded beads were loaded to the 1-L marked line of the measuring cylinder. Then, the mass (g) of the expanded beads in the 1-L volume was weighed. Next, by converting the unit to mass per 1-L volume, the bulk density (kg/m$^3$) was calculated. It should be noted that a lower bulk density indicates a higher expandability.

In addition, the appearance, easiness in casting production, the amount of soot generation of the foamed molded article of each of the Examples and Comparative Examples were evaluated in the following manner. The results are shown in Tables 1 and 2.

[Appearance]

The presence of gaps and melting on the surface of the foamed molded article was visually observed, and evaluated using the following judgment criteria. An evaluation of "A" was made when no gaps and no melting were observed on the surface of the foamed molded article, an evaluation of "B" was made when a small number of gaps and a small amount of melting were observed on the surface of the foamed molded article, and an evaluation of "C" was made when a large number of gaps and a large amount of melting were observed on the surface of the foamed molded article.

[Easiness in Casting Production]

The easiness in casting production was evaluated based on the casting surface and the manner how the casting proceeded. First, the foamed molded article was prepared from the expanded beads obtained by expanding the expandable beads to a density of approximately 30 kg/m$^3$ in a preliminary expanding. The foamed molded article had a density of 30 kg/m$^3$, and the shape was rectangular parallelepiped with a dimension of width 75 mm×height 150 mm×thickness 40 mm. By using this foamed molded article as a casting pattern (evaporative pattern), casting of a metal was performed. The casting was performed as described below using full-mode casting method. Spheroidal graphite cast iron (FCD) was used as the metal for casting, an alkaline phenol gas cured binder resin (Kao Step C-800 manufactured by Kao (Co., Ltd.)) was used as the sand, and a zircon-based coating agent was used as the coating agent. To a cast frame, the casting pattern, a runner, and a gate were placed, and the sand was loaded. Then, carbon dioxide gas was filled in the cast frame so as to spread throughout the whole cast frame, and the sand was hardened. A sprue and a discharge gate were attached, and casting was performed by pouring heated molten metal through the sprue. The temperature of the molten metal during casting was approximately 1400° C. After casting was finished and after the metal had cooled down, the metal casting was removed from the cast frame, and shot-blast processing was performed thereon.

Casting Surface Evaluation

The presence of any flaws caused by soot in the casting prepared as described above was visually determined, and a judgment of the following A, B, or C was conducted.

A: Cases in which no flaws caused by soot were observed in the casting

B: Cases in which a small number of flaws caused by soot was observed in the casting C: Cases in which a large number of flaws caused by soot was observed in the casting Pouring Proceeding Manner The presence of spit-backing of the molten metal when the molten metal was poured through the sprue as described above was visually determined, and a judgment of the following A, B, or C was conducted.

A: Cases in which no spit-backing occurred

B: Cases in which spit-backing occurred slightly

C: Cases in which spit-backing occurred intensively

[Soot Generation Amount]

From the foamed molded article, a test piece having a dimension of height 75 mm×width 25 mm×thickness 25 mm was cut out. The density of the test piece was 20 kg/m$^3$. The test piece was horizontally attached to a clamp, and a flame was brought in contact with the test piece. The amount of soot generated at this moment was visually observed, and judged based on the criteria described below. An evaluation of "A" was made when almost no soot was generated, an evaluation of "B" was made when a small amount of soot was generated, and an evaluation of "C" was made when a large amount of soot was generated.

TABLE 1

|  |  |  |  | Example No. | | | |
|---|---|---|---|---|---|---|---|
|  |  |  |  | Example 1 | Example 2 | Example 3 | Example 4 |
| Acrylic resin | Content ratio of methacrylic ester component | Methyl methacrylate | mol % | 89 | 91 | 87 | 89 |
|  |  | Dicyclopentanyl methacrylate | mol % | 5 | 3 | 7 | — |
|  |  | Isobornyl methacrylate | mol % | — | — | — | 5 |
|  |  | Methyl adamantyl methacrylate | mol % | — | — | — | — |
|  |  | Total | mol % | 94 | 94 | 94 | 94 |
|  | Content ratio of acrylic ester component | Methyl acrylate | mol % | 6 | 6 | 6 | 6 |
|  |  | Dicyclopentanyl acrylate | mol % | — | — | — | — |
|  |  | Total | mol % | 6 | 6 | 6 | 6 |
|  | Content ratio of polycyclic (meth)acrylic ester | | mol % | 5 | 3 | 7 | 5 |
|  | Molecular weight | Mn | ×10$^4$ | 6.6 | 6.6 | 6.8 | 7.3 |
|  |  | Mw | ×10$^4$ | 13.7 | 12.5 | 13.0 | 15.8 |
|  |  | Mz | ×10$^4$ | 22.4 | 19.8 | 20.6 | 27.3 |
|  | Glass transition temperature | | ° C. | 116 | 116 | 116 | 118 |

TABLE 1-continued

| | | | | | | | |
|---|---|---|---|---|---|---|---|
| Physical blowing agent | | Content ratio of n-pentane | mass % | 5.2 | 5.4 | 5.8 | 5.7 |
| | | Content ratio of i-pentane | mass % | 1.2 | 1.2 | 1.4 | 1.3 |
| | | Content ratio of cyclohexane | mass % | 3.5 | 3.3 | 3.5 | 3.5 |
| | | Ratio of alicyclic saturated hydrocarbon | mass % | 35 | 33 | 33 | 33 |
| Expandable resin bead | | Content ratio of volatile components | mass % | 8.6 | 8.3 | 9.3 | 9.2 |
| | | Content ratio of water | mass % | 0.8 | 0.6 | 0.7 | 0.7 |
| | | Mean bead diameter | mm | 0.5 | 0.5 | 0.5 | 0.6 |
| | | Evaluation of expandability | kg/m³ | 16 | 15 | 16 | 18 |
| Expanded beads molded article | Appearance | Heat from steam when molding: 0.07 MPa | — | A | A | B | A |
| | | Heat from steam when molding: 0.09 MPa | — | A | B | A | A |
| | Evaluation of casting production | Casting surface | — | A | A | A | A |
| | | Pouring proceeding manner | — | A | A | A | A |
| | Combustion | Amount of soot | — | A | A | A | A |

| | | | | Example No. | | | |
|---|---|---|---|---|---|---|---|
| | | | | Example 5 | Example 6 | Example 7 | Example 8 |
| Acrylic resin | Content ratio of methacrylic ester component | Methyl methacrylate | | 89 | 98 | 96 | 95 |
| | | Dicyclopentanyl methacrylate | | — | — | — | — |
| | | Isobornyl methacrylate | | — | — | — | — |
| | | Methyl adamantyl methacrylate | | 5 | — | — | — |
| | | Total | | 94 | 98 | 96 | 95 |
| | Content ratio of acrylic ester component | Methyl acrylate | | 6 | — | — | — |
| | | Dicyclopentanyl acrylate | | — | 2 | 4 | 5 |
| | | Total | | 6 | 2 | 4 | 5 |
| | | Content ratio of polycyclic (meth)acrylic ester | | 5 | 2 | 4 | 5 |
| | Molecular weight | Mn | | 7.2 | 5.9 | 6.6 | 6.7 |
| | | Mw | | 15.4 | 11.7 | 12.8 | 12.9 |
| | | Mz | | 25.9 | 18.6 | 20.7 | 20.5 |
| | | Glass transition temperature | | 117 | 120 | 121 | 120 |
| Physical blowing agent | | Content ratio of n-pentane | | 6.1 | 4.9 | 5.2 | 5.6 |
| | | Content ratio of i-pentane | | 1.5 | 1.1 | 1.2 | 6.8 |
| | | Content ratio of cyclohexane | | 3.6 | 3.1 | 3.3 | 3.4 |
| | | Ratio of alicyclic saturated hydrocarbon | | 32 | 34 | 34 | 21 |
| Expandable resin bead | | Content ratio of volatile components | | 9.6 | 8.1 | 8.3 | 9.0 |
| | | Content ratio of water | | 0.5 | 0.9 | 0.6 | 0.5 |
| | | Mean bead diameter | | 0.5 | 0.5 | 0.5 | 0.5 |
| | | Evaluation of expandability | | 16 | 18 | 18 | 15 |
| Expanded beads molded article | Appearance | Heat from steam when molding: 0.07 MPa | | A | A | A | B |
| | | Heat from steam when molding: 0.09 MPa | | A | B | A | A |
| | Evaluation of casting production | Casting surface | | A | A | A | A |
| | | Pouring proceeding manner | | A | A | A | A |
| | Combustion | Amount of soot | | A | A | A | A |

TABLE 2

| | | | | Comparative Example No. | |
|---|---|---|---|---|---|
| | | | | Comparative Example 1 | Comparative Example 2 |
| Acrylic resin | Content ratio of methacrylic ester component | Methyl methacrylate | mol % | 68 | 100 |
| | | Dicyctopentanyl methacrylate | mol % | — | — |
| | | Cyclohexyl methacrylate | mol % | — | — |
| | | Total | mol % | 68 | 100 |
| | Content ratio of acrylic ester component | Methyl acrylate | mol % | — | — |
| | | Dicyctopentanyl acrylate | mol % | — | — |
| | | Total | mol % | 0 | 0 |
| | | Content ratio of polycyclic (meth)acrylic ester | mol % | 0 | 0 |
| | Other components | Styrene | mol % | 24 | — |
| | | Alpha-methylstyrene | mol % | 8 | — |
| | Molecular weight | Mn | ×10⁴ | 3.3 | 6.0 |
| | | Mw | ×10⁴ | 9.6 | 11.1 |
| | | Mz | ×10⁴ | 18.7 | 17.3 |
| | | Glass transition temperature | ° C. | 114 | 109 |
| Physical blowing agent | | Content ratio of n-pentane | mass % | 5.2 | 4.4 |
| | | Content ratio of i-pentane | mass % | 1.4 | 5.5 |
| | | Content ratio of cyclohexane | mass % | — | 2.9 |
| | | Ratio of alicyclic saturated hydrocarbon | mass % | 0 | 22 |

TABLE 2-continued

| | | | | | |
|---|---|---|---|---|---|
| Expandable resin bead | | Content ratio of volatile components | mass % | 8.4 | 6.9 |
| | | Content ratio of water | mass % | 0.5 | 1.2 |
| | | Mean bead diameter | mm | 0.4 | 0.6 |
| | | Evaluation of expandability | kg/m³ | 16 | 29 |
| Expanded beads molded article | Appearance | Heat from steam when molding: 0.07 MPa | — | A | C |
| | | Heat from steam when molding: 0.09 MPa | — | A | C |
| | Evaluation of casting production | Casting surface | — | B | C |
| | | Pouring proceeding manner | — | B | C |
| | Combustion | Amount of soot | — | C | A |

| | | | Comparative Example No. | |
|---|---|---|---|---|
| | | | Comparative Example 3 | Comparative Example 4 |
| Acrylic resin | Content ratio of methacrylic ester component | Methyl methacrylate | 94 | 88 |
| | | Dicyctopentanyl methacrylate | — | — |
| | | Cyclohexyl methacrylate | — | 6 |
| | | Total | 94 | 94 |
| | Content ratio of acrylic ester component | Methyl acrylate | 6 | 6 |
| | | Dicyctopentanyl acrylate | — | — |
| | | Total | 6 | 6 |
| | | Content ratio of polycyclic (meth)acrylic ester | 0 | 0 |
| | Other components | Styrene | — | — |
| | | Alpha-methylstyrene | — | — |
| | Molecular weight | Mn | 6.7 | 6.9 |
| | | Mw | 12.8 | 14.9 |
| | | Mz | 20.2 | 24.7 |
| | | Glass transition temperature | 110 | 109 |
| Physical blowing agent | | Content ratio of n-pentane | 4.4 | 5.4 |
| | | Content ratio of i-pentane | 1.0 | 1.3 |
| | | Content ratio of cyclohexane | 2.8 | 3.5 |
| | | Ratio of alicyclic saturated hydrocarbon | 34 | 35 |
| Expandable resin bead | | Content ratio of volatile components | 6.7 | 9.0 |
| | | Content ratio of water | 1.0 | 0.7 |
| | | Mean bead diameter | 0.5 | 0.5 |
| | | Evaluation of expandability | 15 | 12 |
| Expanded beads molded article | Appearance | Heat from steam when molding: 0.07 MPa | C | C |
| | | Heat from steam when molding: 0.09 MPa | C | C |
| | Evaluation of casting production | Casting surface | C | C |
| | | Pouring proceeding manner | A | A |
| | Combustion | Amount of soot | A | A |

As shown in Table 1, the expandable resin beads of Examples 1 to 8 were excellent in expandability. In addition, the foamed molded articles obtained by using these expandable resin beads have excellent appearance in a range of steam pressure of 0.07 to 0.09 MPa (G), and were excellent in moldability. Furthermore, these foamed molded articles generated almost no soot during combustion, and no smears or the like were observed on the casting surfaces in the evaluation of casting production. These foamed molded articles had a low decomposition gas generation speed, and did not show any problems regarding the manner how the casting proceeded. An equivalent advantageous effect was obtained even when dicyclopentanyl group was used as in Examples 1 to 3 and 6 to 8, when isobornyl group was used as in Example 4, and when methyl adamantyl group was used as in Example 5, as the polycyclic saturated hydrocarbon group. Furthermore, it can be understood from a comparison between Examples 1 to 5 and Examples 6 to 8 that an equivalent advantageous effect was obtained no matter which of the methacrylic ester component (A) or the acrylic ester component (B) had the polycyclic saturated hydrocarbon group.

On the other hand, in Comparative Example 1, since a styrene component was blended therein, the generation amount of soot was large, and the casting had flaws caused by soot. In addition, in Comparative Example 1, slight spit-backing was observed during the pouring.

In Comparative Example 2, since no acrylic ester component was blended therein, intense spit-backing was observed during the pouring. In addition, since the acrylic resin did not have the polycyclic saturated hydrocarbon group, the glass transition temperature was low. As a result, moldability of the expanded beads was deteriorated, and there was a problem related to appearance of the foamed molded article.

In Comparative Example 3, since the acrylic resin was derived from methyl methacrylate and methyl acrylate, evaluation of casting production was improved. On the other hand, since a component having the polycyclic saturated hydrocarbon group is not blended therein, the glass transition temperature of the acrylic resin was low, moldability of the expanded beads was deteriorated, and there was a problem related to appearance of the foamed molded article.

In Comparative Example 4, although a component having a monocyclic saturated hydrocarbon group was blended in the acrylic resin, a component having the polycyclic saturated hydrocarbon group was not blended therein. Thus, the glass transition temperature of the acrylic resin was low. As a result, moldability of the expanded beads was deteriorated, and there was a problem related to appearance of the foamed molded article.

What is claimed is:

1. An expandable acrylic resin bead comprising:
    an acrylic resin having a glass transition temperature of 112 to 125° C.; and
    a physical blowing agent;
    wherein the acrylic resin comprises
        a methacrylic ester component (A) and an acrylic ester component (B),
        a content of the component (A) being 85 to 99 mol % with respect to a total 100 mol % of the component (A) and the component (B), and
        at least one of the component (A) and the component (B) containing a component having a polycyclic saturated hydrocarbon group.

2. The expandable acrylic resin bead according to claim 1, wherein the acrylic resin is a copolymer of the component (A) and the component (B).

3. The expandable acrylic resin bead according to claim 1, wherein a content of the component having the polycyclic saturated hydrocarbon group in the acrylic resin is not more than 20 mol % with respect to the total 100 mol % of the component (A) and the component (B).

4. The expandable acrylic resin bead according to claim 1, wherein the polycyclic saturated hydrocarbon group is dicyclopentanyl group, adamantyl group, norbornyl group, or isobornyl group.

5. The expandable acrylic resin bead according to claim 1, wherein a weight-average molecular weight of the acrylic resin is 50,000 to 300,000.

6. An expanded acrylic resin bead obtained by expansion of the expandable acrylic resin bead according to claim 1.

7. An expanded acrylic resin bead obtained by expansion of the expandable acrylic resin bead according to claim 2.

8. An expanded acrylic resin bead obtained by expansion of the expandable acrylic resin bead according to claim 3.

9. An expanded acrylic resin bead obtained by expansion of the expandable acrylic resin bead according to claim 4.

10. An expanded acrylic resin bead obtained by expansion of the expandable acrylic resin bead according to claim 5.

11. A foamed molded article obtained by in-mold molding the expanded acrylic resin beads according to claim 6.

12. A foamed molded article obtained by in-mold molding the expanded acrylic resin beads according to claim 7.

13. A foamed molded article obtained by in-mold molding the expanded acrylic resin beads according to claim 8.

14. A foamed molded article obtained by in-mold molding the expanded acrylic resin beads according to claim 9.

15. A foamed molded article obtained by in-mold molding the expanded acrylic resin beads according to claim 10.

* * * * *